July 9, 1935.  C. H. HAPGOOD  2,007,163

ELECTROPNEUMATIC MILKING MACHINE PULSATION MECHANISM

Filed March 16, 1933

WITNESS:
Robt R Kitchel

INVENTOR
Cyrus Howard Hapgood
BY
Busser and Harding
ATTORNEYS.

Patented July 9, 1935

2,007,163

UNITED STATES PATENT OFFICE 2,007,163

ELECTROPNEUMATIC MILKING MACHINE PULSATION MECHANISM

Cyrus Howard Hapgood, Nutley, N. J., assignor to The De Laval Separator Company, New York, N. Y., a corporation of New Jersey Application March 16, 1933, Serial No. 661,074

3 Claims. (Cl. 175—335)

One well known type of milking machine comprises a vacuum pump adapted to establish a partial vacuum in a vacuum pipe that communicates with the milk chambers of a two chamber teat cup, a pneumatic pulsation pipe communicating with the outer or pulsation chambers of the teat cups (or with udder pulsators which produce pneumatic pulsations in said outer teat cup chambers), pneumatic pulsation valves controlled by electro-magnets and adapted to establish pneumatic pulsations in said pneumatic pulsation pipe, an electric device, such as a circuit maker or breaker, which alternately energizes and de-energizes the magnets (which are in multiple relation) and a cam operable by the vacuum pump and operating the circuit maker and breaker.

In the practical operation of such milking machines, at each break of the circuit including the magnets, there is sparking at the contact points of the make and break switch with resultant wear of the contact points. This is not remedied by providing a shunt circuit including a condenser.

The object of my invention is to provide means to eliminate this sparking.

Figure 1:
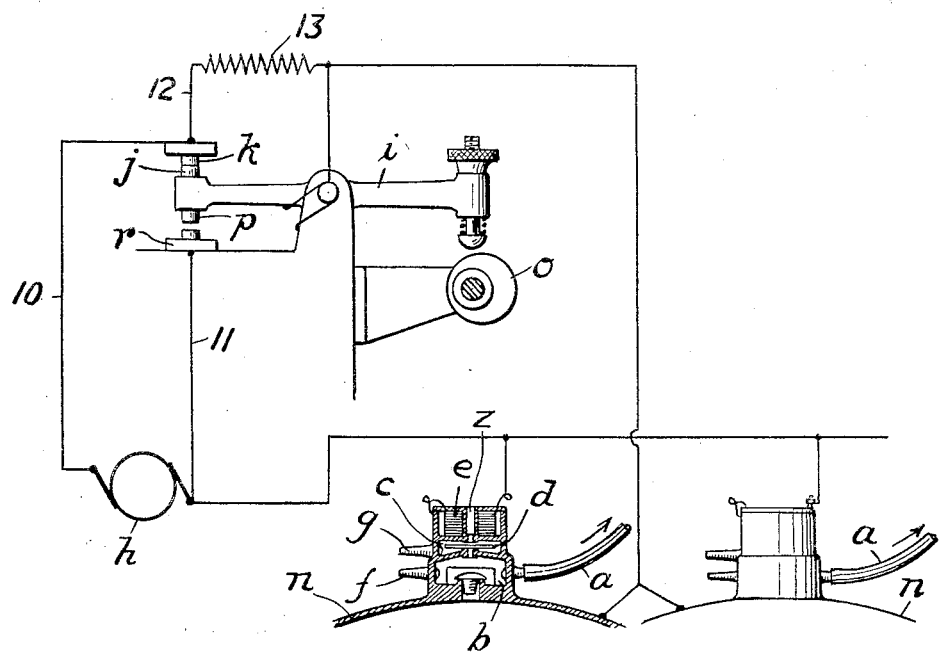

Means for accomplishing this result are disclosed in the accompanying drawing, in which Fig. 1 is a view of two of the electro-magnets, the make and break switch and its operative cam and a diagram of the electric circuit.

Figure 2:
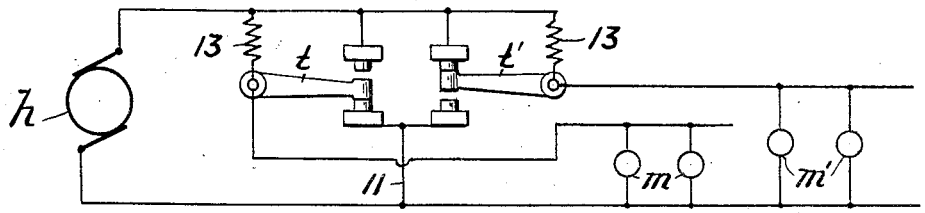

Fig. 2 is a diagrammatic view of a modification.

Each pneumatic pulsator is shown as comprising a vacuum chamber $b$, a pneumatic hose $a$ communicating with chamber $b$ and with the main vacuum pipe line (not shown), a pulsation chamber $c$, a pneumatic pulsator valve $d$, an electro-magnet $e$, a nipple $f$ adapted for connection with the vacuum chamber of an udder pulsator, and a nipple $g$ adapted for direct or indirect connection with the pulsation chambers of teat cups. When the magnet is energized, it lifts valve $d$ off its seat and establishes communication, through chambers $b$ and $c$, between vacuum hose $a$ and nipple $g$. When the magnet is de-energized, gravity and suction cause valve $d$ to seat and open communication, through a central passage $z$ in magnet $e$ and chamber $c$, between the atmosphere and nipple $g$. The electro-magnetic pulsator described is shown as mounted on a milk pail, but it may be positioned otherwise, as for example, at the junction of the main vacuum pipe line and the pneumatic hose, as is well understood in the art.

An electric circuit 10 includes a generator $h$, the magnets $e$, the milk pail $n$, and the reciprocable make and break device comprising a lever $i$ having contact $j$ adapted to be moved into and out of contact with a fixed contact $k$. The lever $i$ is actuable to make and break the circuit at the contacts by means of a cam $o$ adapted by a vacuum pump, not shown.

The above description applies to an old and well known construction.

In my improvement, the lever $i$ is provided with another contact $p$ adapted, when the lever is swung to open the circuit between contacts $j$ and $k$, to engage a fixed contact $r$ in electric connection, through a conductor $11$, with circuit $10$. A conductor $12$, including a resistance $13$, electrically connects fixed contact $k$ with lever $i$.

After the circuit is broken at contacts $j$ and $k$, the magnetic field surrounding magnets $e$ collapses and the high voltage current thus induced passes through resistance $13$ instead of jumping between contacts $j$ and $k$. The current passing through resistance $13$ might suffice to hold valve $d$ against magnets $e$, if this were not prevented by the immediate closing of the circuit through contacts $p$ and $r$; the current then passing through resistance $13$, lever $i$, contacts $p$ and $r$ and conductor $11$, thus short circuiting the magnets $e$.

In Fig. 2 there is shown a series-multiple arrangement of magnets $m$, $m'$ and two switch levers $t$, $t'$ arranged in parallel. The operation of the modification is substantially the same as that of the construction shown in Fig. 1; except that the circuit is, preferably, closed alternately through the two sets of magnets $m$ and $m'$.

What I claim is:

1. In a milking machine having a number of pneumatic pulsators and controlling electro-magnets for the respective pulsators, the combination, with a main electric circuit of which the magnets are a part, a make and break device comprising switch contacts in the main circuit and means to operate the make and break device to close and open the main circuit at the switch contacts, of a circuit shunted around the magnets, and means to open the shunt circuit before the main circuit is closed at said switch contacts and to close the shunt circuit after the main circuit is opened at said switch contacts.

2. In a milking machine having a number of pneumatic pulsators and controlling electro-magnets for the respective pulsators, the combination, with a make and break device comprising a fixed contact and a lever movable into and out of contact with the fixed contact, an electric generator and a main electric circuit including said generator, said contacts and said magnets, of a second fixed contact adapted to be engaged by said lever when said lever opens the main circuit at the first fixed contact, a conductor between the first fixed contact and said lever, and a conductor between the second fixed contact and the main circuit, current flowing in the main circuit being shunted through said conductors and said lever when the lever engages the second fixed contact.

3. In a milking machine having a number of pneumatic pulsators and controlling electromagnets for the respective pulsators, the combination, with a make and break device comprising a fixed contact and a lever movable into and out of contact with the fixed contact, an electric generator and a main electric circuit including said generator, said contacts and said magnets, of a second fixed contact adapted to be engaged by said lever when said lever opens the main circuit at the first fixed contact, a conductor and resistance between the first fixed contact and said lever, and a conductor between the second fixed contact and the main circuit.

CYRUS HOWARD HAPGOOD.